US012011715B2

(12) United States Patent
Smith et al.

(10) Patent No.: US 12,011,715 B2
(45) Date of Patent: Jun. 18, 2024

(54) TAILORABLE ELECTRODE CAPPING FOR MICROFLUIDIC DEVICES

(71) Applicant: International Business Machines Corporation, Armonk, NY (US)

(72) Inventors: Joshua T. Smith, Croton on Hudson, NY (US); Benjamin Hardy Wunsch, Mt. Kisco, NY (US); Adele L. Pacquette, Elmsford, NY (US); Eugene J. O'Sullivan, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 17/095,538

(22) Filed: Nov. 11, 2020

(65) Prior Publication Data

US 2022/0143605 A1 May 12, 2022

(51) Int. Cl.
*B01L 3/00* (2006.01)

(52) U.S. Cl.
CPC ... *B01L 3/502715* (2013.01); *B01L 3/502707* (2013.01); *B01L 2200/12* (2013.01); *B01L 2300/0645* (2013.01)

(58) Field of Classification Search
CPC ......... B01L 3/502715; B01L 3/502707; B01L 2200/12; B01L 2300/0645;
(Continued)

(56) References Cited

U.S. PATENT DOCUMENTS

| | | | |
|---|---|---|---|
| 2,656,508 | A | 10/1953 | Coulter |
| 6,727,593 | B2 | 4/2004 | Toyoda et al. |

(Continued)

FOREIGN PATENT DOCUMENTS

| | | | |
|---|---|---|---|
| CN | 109311658 | A | 2/2019 |
| CN | 111750142 | A | 10/2020 |

OTHER PUBLICATIONS

Bhat et al., "Tank Circuit for Ultrafast Single-Particle Detection in Micropores", Phys. Rev. Lett., 121, pp. 078102-1-078102-5, © 2018 American Physical Society.

(Continued)

*Primary Examiner* — Jill A Warden
*Assistant Examiner* — Michael Stanley Gzybowski
(74) *Attorney, Agent, or Firm* — Kelli Morin

(57) ABSTRACT

A method of forming a microfluidic device is disclosed. The method includes forming a first dielectric layer on a substrate, forming electrodes partially into the first dielectric layer, and forming a second dielectric layer on the electrodes. The method includes filling, with a metal material, two wells formed in the second dielectric layer such that the metal material is in direct contact with the electrodes. The method includes forming a third dielectric layer on the metal material and second dielectric layer. The method includes filling, with a structural material, a channel formed between the wells such that the structural material does not directly contact the electrodes. The method includes forming a fourth dielectric layer on the third dielectric layer and the structural material, extracting the structural material through at least one vent hole in the fourth dielectric layer, and forming a fifth dielectric layer on the fourth dielectric layer.

9 Claims, 8 Drawing Sheets

(58) Field of Classification Search
CPC .. B01L 2400/0415–0427; G01N 15/12; G01N 15/13; G01N 2015/135
See application file for complete search history.

(56) References Cited

U.S. PATENT DOCUMENTS

| | | | |
|---|---|---|---|
| 7,190,079 | B2 | 3/2007 | Andriacacos et al. |
| 7,843,067 | B2 | 11/2010 | Cotte et al. |
| 7,960,269 | B2 | 6/2011 | Lo et al. |
| 8,314,494 | B2 | 11/2012 | Nopper et al. |
| 8,941,240 | B2 | 1/2015 | Deligianni et al. |
| 9,023,137 | B2 | 5/2015 | Kong et al. |
| 9,147,635 | B2 | 9/2015 | Trezza et al. |
| RE46,671 | E | 1/2018 | Combi et al. |
| 10,168,299 | B2 | 1/2019 | Pyzyna et al. |
| 10,247,700 | B2 | 4/2019 | Hu et al. |
| 10,560,065 | B2 * | 2/2020 | Kishimoto ............... H03H 9/25 |
| 2013/0265031 | A1 | 10/2013 | Shim et al. |
| 2014/0308752 | A1 | 10/2014 | Chang et al. |
| 2016/0266063 | A1 | 9/2016 | Chang et al. |
| 2017/0122903 | A1 | 5/2017 | Hu et al. |
| 2018/0217083 | A1 | 8/2018 | Kuo et al. |
| 2019/0127219 | A1 | 5/2019 | Bengali et al. |
| 2020/0070150 | A1 | 3/2020 | Liu et al. |
| 2020/0070151 | A1 | 3/2020 | Liu et al. |
| 2020/0098534 | A1 | 3/2020 | Smith et al. |

OTHER PUBLICATIONS

Chen et al., “Electrical nanogap devices for biosensing,” Materials Today, 13, 11, p. 28-41, 2010.

De Blois et al., “Counting and Sizing of Submicron Particles by the Resistive Pulse Technique”, The Review of Scientific Instruments, vol. 41, No. 7, Jul. 1970, 8 pgs.

Fraikin, et al., “A high-throughput label-free nanoparticle analyser”, Nat. Nanotech., 6, pp. 308-313, 2011.

Ionera, “ionera . . . wherever ions flow,” https://www.ionera.de/technology.htm, printed Sep. 21, 2020, 2 pgs.

Izon, “How TRPS Works | Izon Science,” https://izon.com/how-trps-works/, printed Sep. 21, 2020, 5 pgs.

Lam et al., “Programmable definition of nanogap electronic devices using self-inhibited reagent depletion,” Nat. Commun., 6, p. 1-6, 2015.

Liang et al., “Nanogap Detector Inside Nanofluidic Channel for Fast Real-Time Label-Free DNA Analysis,” Nano Lett., 8, 5, p. 1472-1476, 2008.

Liu et al., Method to Create Multilayer Microfluidic Chips Using Spin-On Carbon as Gap Fill and Spin-On Glass Tone Inversion, U.S. Appl. No. 62/723,687, filed Aug. 28, 2018.

Liu et al., “Method to Create Multilayer Microfluidic Chips Using Spin-On Carbon as Gap Filling Materials,” U.S. Appl. No. 62/724,149, filed Aug. 29, 2018.

Nabsys, “Technology—Nabsys,” https://nabsys.com/technology/, printed Sep. 21, 2020, 4 pgs.

Nanopore Technologies, “Products | Oxford Nanopore Technologies,” https://nanoporetech.com/products, printed Sep. 21, 2020, 5 pgs.

Ontera, “NanoCounter—Ontera.bio—Revolutionizing Molecular Diagnostics with Silicon Nanopore Technology | Ontera,” https://www.ontera.bio/nanocounter, printed Sep. 21, 2020, 4 pgs.

Ren et al., “Materials for Microfluidic Chip Fabrication,” Research Gate, Article in Accounts of Chemical Research, Nov. 2013, 12 pgs., DOI: 10.1021/ar300314s.

Rosenstein et al., “Integrated nanopore sensing platform with sub-microsecond temporal resolution”, Nature Methods, 9, pp. 487-492, 2012.

Saleh et al., “Direct detection of antibody-antigen binding using an on-chip artificial pore”, PNAS, 100, 3, pp. 820-824, 2003.

Shao et al., “An alternative low resistance MOL technology with electroplated rhodium as contact plugs for 32nm CMOS and beyond”, 2007 IEEE International Interconnect Technology Conference, Jun. 2007, 3 pgs., 10.1109/IITC.2007.382360.

Unknown, Particle Size Analysis, https://nanoparticleanalyzer.com/technology-electrical.php#rps, printed Sep. 21, 2020, 1 pg.

Wu et al. “Separating extracellular vesicles and lipoproteins via acoustofluidics”, Lab Chip, 19, p. 1174-1182, 2019.

International Search Report and Written Opinion, International Application No. PCT/CN2021/126227, Jan. 20, 2022, 8 pgs.

European Patent Office Search Report, Application No./Patent No. 21890950.5—1014 / 4244176 PCT/CN2021126227, May 3, 2024, 10 pgs.

* cited by examiner

TAILORABLE ELECTRODE CAPPING FOR MICROFLUIDIC DEVICES

BACKGROUND

The present disclosure relates to tailorable electrode capping for microfluidic devices and methods of manufacturing microfluidic devices including tailorable electrode caps.

Microfluidic technologies today, particularly as they are used in healthcare, are largely dominated by fluorescence detection methods, wherein fluorophores are excited by an incident light source of a specific wavelength, causing them to emit light at a longer wavelength to produce a signal that provides information about the presence of an analyte within a fluidic sample. DNA sequencing, enzyme linked immunosorbent assays (ELISA), and fluorescence in situ hybridization (FISH) are but a few examples that demonstrate the widespread adoption of such fluorescence-based approaches.

SUMMARY

Embodiments of the present disclosure relate to a method of manufacturing microfluidic devices including tailorable electrode caps. The method includes forming a first dielectric layer on a substrate. The method further includes forming electrodes partially into the first dielectric layer. The method further includes forming a second dielectric layer on the electrodes. The method further includes filling, with a metal material, two wells formed in the second dielectric layer such that the metal material is in direct contact with the electrodes. The method further includes forming a third dielectric layer on the metal material and on the second dielectric layer. The method further includes filling, with a structural material, a channel formed between the two wells such that the structural material does not directly contact the electrodes. The method further includes forming a fourth dielectric layer on the third dielectric layer and on the structural material. The method further includes extracting the structural material through at least one vent hole formed in the fourth dielectric layer. The method further includes forming a fifth dielectric layer on the fourth dielectric layer.

Other embodiments relate to microfluidic devices including tailorable electrode caps formed by the method described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1A:
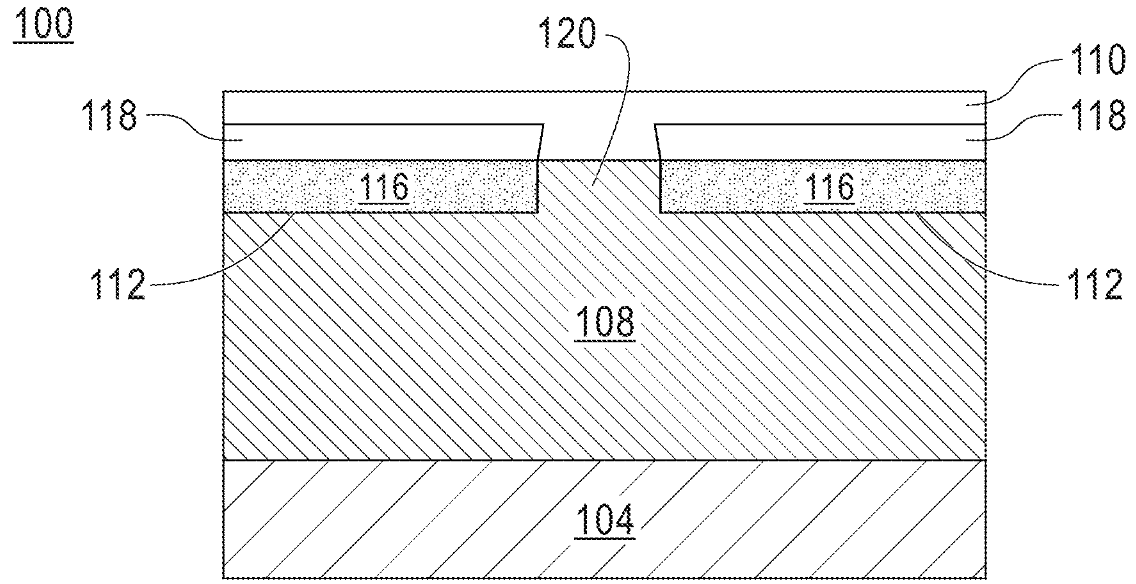
FIG. 1A illustrates a cross-sectional top perspective view of a device at one stage in a manufacturing process, in accordance with some embodiments of the present disclosure.

The present disclosure describes embodiments of tailorable electrode capping for microfluidic devices and methods of manufacturing microfluidic devices including tailorable electrode caps.

From in vitro diagnostics and pharmaceutical and life science research to drug delivery and laboratory testing, the global microfluidics market is projected to reach 27.9 billion dollars by 2023. Of this market, microfluidic chips and microfluidic sensors relevant to this invention represent 4.4 billion dollars (CAGR 20%) and 1.9 billion dollars (CAGR 21.1%) of the projected market size for 2023. While polymer materials dominate as a material platform due to low-cost manufacturing, silicon-based microfluidic platforms are responsible for 262 million dollars (2018) in revenue, projected to 506 million dollars by 2023 (CAGR 14.1%), owing the unique and irreplaceable advantages silicon offers for certain applications, such as superior feature scaling, parallel sample processing capabilities, direct integration with CMOS circuitry, thermostability, resistance to oxidizers, and compatibility with solvents as compared to other material choices, such as elastomers, thermoplastics, or paper.

Many of these microfluidic devices contain electrodes that must interface with fluidic samples, and in many cases inferior processes are used to form electrodes, such as subtractive etching or e-beam evaporation, which decrease yield and limit scalability. However, to take advantage of parallelization and scaling that would allow hundreds to thousands of electrodes and channels in a device, enabling higher sample throughput, faster time-to-result and simultaneous detection of multiple analytes, the present disclosure enables directly plating scalable, secondary metal caps of choice to manufacturing-friendly copper primary electrodes. Accordingly, one advantage of the present disclosure is the ability to directly cap copper metals, electrodes, interconnects, or three-dimensional scaffolds with any metal of choice using electrodeposition.

Another advantage of the present disclosure is that such features can then be fluidically sealed without the need for bonding. As described in further detail below, the present disclosure also describes the implementation of an extraction process, such as a carbon-pull process, for sealing the microfluidic chips, avoiding the need for yield-decreasing bonding processes.

This process also lends itself to multilayer (three-dimensional) fluidic networks needed to feed, in parallel, multiple sensing devices simultaneously. Accordingly, another advantage of the present disclosure is that it opens up possibilities for silicon-based microfluidic technologies, such as multiplexing complex assays for healthcare with multiple biomarker targets in a single fluid sample.

Despite their popularity, use of fluorescence detection methods in microfluidic technologies often requires bulky instrumentation, including large and expensive optics, which limits scalability to, at best, desktop-size systems. Size and cost of these technologies contribute to keeping them out of the field and isolated within research or centralized laboratories. Accordingly, there is a need for portable devices that are deployable for rapid, on-site diagnostics and monitoring in healthcare, agricultural, industrial, and environmental settings.

Electrical detection has been recognized as a critical path toward device portability in these fields and would allow for fast or real-time results. As one example, electrical nanogap devices have been developed to transduce binding or proximity events into useful electrical signals. These devices operate on the principles of resistance/impedance, capacitance/dielectric, or field-effect to produce these signals. For example, some known technologies seek to create nanogap devices using tilted evaporation techniques and self-inhibited reagent depletion. However, neither of these approaches lends itself to reliable or scalable manufacturing processes to produce electrical detection devices. Recently, some technologies have used patterning transverse palladium electrodes within nanochannels, employing a water-based polish and release layer that cuts the palladium using a helium ion beam. Another technology generally uses the same process but with the implementation of a hydrogen silsesquioxane 'knockoff' feature to define the nanogap instead of a helium ion beam. While these improvements add an element of manufacturability and can be carried out at wafer scale, helium ion beam cutting is not a scalable process and the 'knockoff' approach requires e-beam lithography, which is expensive and low-throughput. Additionally, such processes have only been demonstrated using palladium as an electrode material. It is desirable to develop technologies wherein any noble metal or alloy could be used to form scalable electrodes tailored for a given application.

In addition to nanogap electrode pairs, metal electrodes are used in microfluidics for several other purposes. For example, metal electrodes are used as sense electrodes in resistive-pulse sensing (RPS) devices and electrodes for controlling the kinetics of particles within heterogenous fluids for sorting as well as for electroporation and fluidic and particle locomotion. In other words, the need for specialized metal electrodes that can interface with microfluidic samples in micro-total analysis systems (μtTAS) and lab-on-chip (LOC) devices is ubiquitous.

One representation of this need exists in RPS technology. RPS technology is used as an illustrative example given its maturity and immediate commercial relevance, although the need broadly applies to devices with other electrode functions as already described. RPS devices are used to count and measure the size of individual particles suspended in a weakly conducting fluid by flowing them through a nanoconstriction where they are sensed electrically by electrodes located on either side of the constricted region. Since the invention of RPS in the early 1950's, there have been many academic implementations of and improvements on the technology. Beyond the academic arena, and in some cases as extensions of it, several commercial versions of this well-established technology have come into being in various forms. However, the challenge of electrode integration limits the number of channels available within a single RPS device. In fact, many commercially available options are nothing more than simple single channel Coulter counters.

In contrast, a platform that ultimately allows hundreds to thousands of RPS electrodes and channels would enable higher sample throughput, faster time-to-result, and simultaneous detection of multiple analytes made possible by parallel processing of fluid samples.

To this end, as discussed in further detail below, the tailorable electrode capping for microfluidic devices and methods of manufacturing microfluidic devices including tailorable electrode caps disclosed herein facilitate massive and scalable parallelization of electrode materials that are robust to microfluidic environments.

The present disclosure embodies structures and methods for manufacturably forming primary copper (Cu) electrodes that are capped, or coated, with secondary noble metals or alloys and sealed within microfluidic cavities on silicon chips. In particular, the secondary noble metals or alloys may be arranged directly, meaning without a liner, on the primary copper electrodes. In other words, embodiments of the present disclosure do not include any liner or other material interposed between the primary copper electrodes and the secondary noble metals or alloys.

The properties of the secondary capping metals can be tailored for interfacing with complex fluids, such as biological samples (for example, urine or blood-based samples), and can therefore be used to control the flow of the fluid directly (for example, through electroosmosis), or be used to quantitatively detect particles found within these fluids (for example, using RPS), over prolonged durations and more reliably.

As a substrate material for microfluidics, silicon offers superior feature scaling, parallel sample processing capabilities, direct integration with complementary metal-oxide-semiconductor (CMOS) circuitry, thermostability, resistance to oxidizers, and compatibility with solvents as compared to other material choices, such as elastomers, thermoplastics, or paper. Accordingly, using silicon gives embodiments of the present disclosure a distinct set of advantages over these other material platforms. However, one disadvantage of using a silicon-based platform is the fabrication limitations imposed on the metals used for the primary electrodes that ultimately interface with the microfluidic environment. In particular, use with a silicon-based platform is generally restricted to aluminum (Al), titanium (Ti), tantalum (Ta), titanium nitride (TiN), tantalum nitride (TaN), tungsten (W), and copper (Cu). These are materials which can be seamlessly integrated using a damascene process, whereby the metal, typically Cu, is deposited into patterned structures and then planarized using chemical-mechanical polishing (CMP)—a standard in semiconductor processing. Unfortunately, these same materials rapidly degrade when coupled to fluidic environments.

Embodiments of the present disclosure overcome these fundamental material limitations and expand the list of usable materials to include more inert secondary noble metals, such as gold (Au), platinum (Pt), rhodium (Rh), palladium (Pd), etc. Specifically, these secondary metals can be directly electrodeposited or electrolessly deposited, without a liner, as capping layers, onto the tips of Cu electrodes otherwise buried beneath a dielectric material, such as silicon oxide, thereby selectively coating the Cu in predefined locations. The electrodeposited metals may also be deposited within etched wells of precise dimension to control, with precision, the geometry of the resulting secondary metal. Further, the secondary metal structures themselves may be fabricated within microfluidic channels or reservoirs to detect or manipulate the particles found within fluids or to control the flow of the fluids through the microfluidic device.

Additionally, the cavities, wherein the exposed secondary metal electrodes reside, may also be fluidically sealed during fabrication using a carbon-pull process, whereby an organic resist material acts as a surrogate support to form the channels and reservoirs, after which the filled cavities are coated with a dielectric material and the resist material is then extracted prior to depositing a thick oxide or nitride seal to fluidically seal the final device. Accordingly, embodiments of the present disclosure have broad applicability within the field of microfluidics. In particular, where the above-mentioned advantages of a silicon-based approach are required for a given application, attributes of embodiments of the present disclosure have particular importance within the areas of lab-on-a-chip (LOC) or point-of-care (POC) analysis devices. Moreover, embodiments of the present disclosure enable a fluidically sealable process without the need for bonding. Additionally, embodiments of the present disclosure are directly integrable with CMOS circuitry.

It is to be understood that the aforementioned advantages are example advantages and should not be construed as limiting. Embodiments of the present disclosure can contain all, some, or none of the aforementioned advantages while remaining within the spirit and scope of the present disclosure.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted, the term "selective to," such as, for example, "a first element selective to a second element," means that a first element can be etched, and the second element can act as an etch stop.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

In general, the various processes used to form a microchip that will be packaged into an IC fall into four general categories, namely, film deposition, removal/etching, semiconductor doping and patterning/lithography.

Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Another deposition technology is plasma enhanced chemical vapor deposition (PECVD), which is a process which uses the energy within the plasma to induce reactions at the wafer surface that would otherwise require higher temperatures associated with conventional CVD. Energetic ion bombardment during PECVD deposition can also improve the film's electrical and mechanical properties.

Removal/etching is any process that removes material from the wafer. Examples include etch processes (either wet or dry), chemical-mechanical planarization (CMP), and the like. One example of a removal process is ion beam etching (IBE). In general, IBE (or milling) refers to a dry plasma etch method which utilizes a remote broad beam ion/plasma source to remove substrate material by physical inert gas and/or chemical reactive gas means. Like other dry plasma etch techniques, IBE has benefits such as etch rate, anisotropy, selectivity, uniformity, aspect ratio, and minimization of substrate damage. Another example of a dry removal process is reactive ion etching (RIE). In general, RIE uses chemically reactive plasma to remove material deposited on wafers. With RIE the plasma is generated under low pressure (vacuum) by an electromagnetic field. High-energy ions from the RIE plasma attack the wafer surface and react with it to remove material.

Semiconductor doping is the modification of electrical properties by doping, for example, transistor sources and drains, generally by diffusion and/or by ion implantation. These doping processes are followed by furnace annealing or by rapid thermal annealing ("RTA"). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and gradually the conductors, insulators and selectively doped regions are built up to form the final device.

Referring now to the drawings, in which like numerals represent the same or similar elements, FIGS. 1A-1J depict an illustrative device 100 at various stages in the manufacturing process. The structures of FIGS. 1A-1J are depicted using a view that is substantially cross-sectional, to illustrate the layering aspects of the structure and method of forming the structure, but that is also slightly tilted to show the top or uppermost surface, to illustrate the removal of material at some stages of the method of forming the structure.

As shown in FIG. 1A, a first dielectric layer 108 has been formed on an underlying substrate 104. As used herein, the term "formed" can include, for example, formed by growing or formed by depositing. In particular, the first dielectric layer 108 has been formed by growing or depositing a first dielectric material on the substrate 104.

In the present embodiment, the substrate 104 is made of silicon. However, in alternative embodiments, the substrate 104 may be made of another substrate material, such as quartz, for example. It should be appreciated that the material of the substrate may be any suitable material or combination of materials known to one of skill in the art which supports lab-on-a-chip fabrication processes, and it may be a single layer or a plurality of sublayers. In the present embodiment, the first dielectric material is silicon dioxide. However, in alternative embodiments, other dielectric materials may be used for the first dielectric layer 108.

In at least one embodiment of the present disclosure, the first dielectric layer 108 is formed as a relatively thick layer on the substrate 104. More specifically, in at least one embodiment, the first dielectric layer 108 is thick relative to subsequently formed layers of the device, discussed below. The thickness of the first dielectric layer 108 is selected so as to provide electrical isolation of electrodes (discussed in further detail below) and to minimize electrical noise.

Additionally, as shown in FIG. 1A, depressions 112, which may also be referred to as trenches, have been formed in the first dielectric layer 108 so as to be defined by the first dielectric layer 108. In particular, each depression 112 extends downwardly into the first dielectric layer 108 from an uppermost surface 110 of the first dielectric layer 108. In the present embodiment, the depressions 112 have been formed by applying a first lithography process to the first dielectric layer 108. The first lithography process can be any suitable lithography process known to one of skill in the art that is capable of defining depressions for electrodes.

Each depression 112 is separated from any other depression 112 by a first area 120 of the first dielectric layer 108 that remains, and therefore extends upwardly, between adjacent depressions 112 following the application of the first lithography process to the first dielectric layer 108. In at least some embodiments of the present disclosure, the first area 120 of the first dielectric layer extends to the uppermost surface 110.

Additionally, as shown in FIG. 1A, an electrode 116 has been formed in each of the depressions 112 such that each electrode 116 is formed partially into the first dielectric layer 108. More specifically, at least a portion of the surface area of each electrode 116 is covered by the first dielectric layer 108 such that each of the electrodes 116 is at least partially embedded in the first dielectric layer 108. In other words, the first dielectric layer 108 at least partially surrounds each of the electrodes 116. However, the electrodes 116 are not completely covered or surrounded by the first dielectric layer 108. Instead, each electrode 116 fills a corresponding depression 112 in the first dielectric layer 108 such that an uppermost surface 118 of each electrode 116 is generally coplanar with the uppermost surface 110 of the first dielectric layer 108. The term "coplanar" refers to multiple planar surfaces arranged on the same geometric plane. Accordingly, the electrodes 116 are arranged in the depressions 112 such that the uppermost surface 118 of each electrode 116 is generally arranged on the same geometric plane as the uppermost surface 110 of the first dielectric layer 108. The term "generally" accounts for differences between the two which are minor enough to be able to be further reduced as discussed in further detail below.

The electrodes 116 may be formed using any suitable technique known to one of skill in the art. In at least one embodiment of the present disclosure, the electrodes 116 are made of a first metal material, which is capable of functioning as an electrode. In the present embodiment, each electrode 116 is made of copper. However, in alternative embodiments, the material of the electrodes can be any suitable material or combination of materials known to one of skill in the art. In the present embodiment, a standard Cu damascene process is used to embed the copper electrodes 116 within the first dielectric layer 108 such that the uppermost surface 118 is at least substantially coplanar with the uppermost surface 110 of the first dielectric layer 108.

Additionally, as shown in FIG. 1A, the electrodes 116 have been further processed so as to be at least substantially coplanar with the first dielectric layer 108. More specifically, the electrodes 116 have been further processed such that the uppermost surface 118 of each electrode 116 is at least substantially coplanar with the uppermost surface 110 of the first dielectric layer 108. In at least some embodiments of the present disclosure, a polishing process is used to make the uppermost surface 118 of the electrodes 116 at least substantially coplanar with the uppermost surface 110 of the first dielectric layer 108. The term "at least substantially" accounts for remaining differences between the two which are inconsequential to the performance of subsequent processes and operations. For example, at least substantially coplanar surfaces may be non-coplanar on an atomic level.

Although the embodiment of the present disclosure illustrated in FIG. 1A includes two electrodes 116, in alternative embodiments, the device 100 includes more than two electrodes. In fact, the scalability of the device 100 to include large numbers, such as hundreds to thousands, of electrodes 116 is one advantage of the present disclosure. In such embodiments, the number of electrodes is a multiple of two such that each electrode is part of a pair of electrodes. Additionally, in such embodiments, the number of depressions 112 formed in the first dielectric layer 108 corresponds to the number of electrodes. Accordingly, electrodes may also be referred to herein in pairs. For example, each first area 120 of the first dielectric layer 108 is arranged between the electrodes 116 of a pair of electrodes.

Figure 1B:
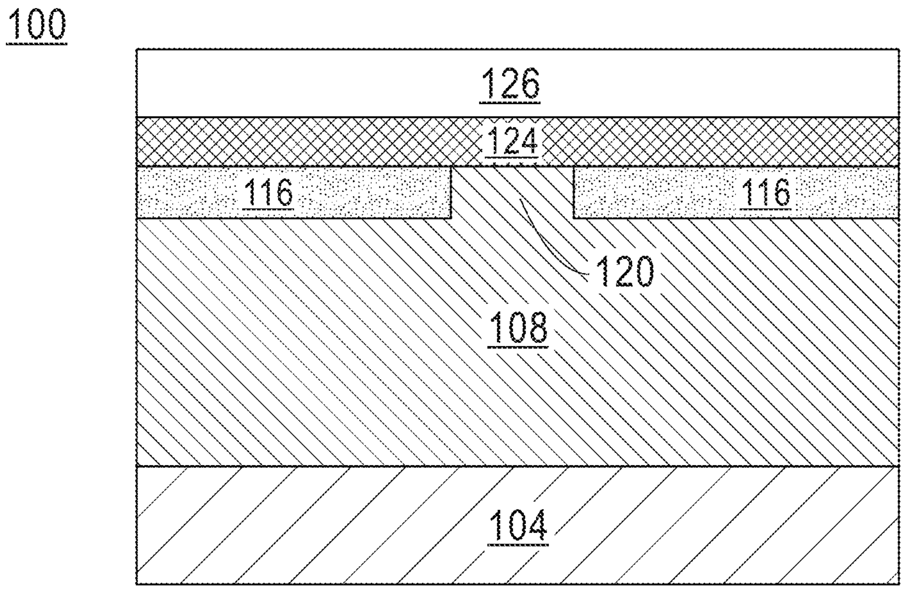
FIG. 1B illustrates a cross-sectional top perspective view of the device of FIG. 1A at a subsequent stage in a manufacturing process, in accordance with some embodiments of the present disclosure.

Turning now to FIG. 1B, the device 100 is shown after a second dielectric layer 124 has been formed by growing or depositing a layer of a second dielectric material on the substantially coplanar uppermost surfaces 110, 118 (shown in FIG. 1A) of the first dielectric layer 108 and electrodes 116, respectively. In particular, the second dielectric layer 124 extends over an entirety of the uppermost surface 118 of each electrode 116 and over the first area 120 of the first dielectric layer 108 between each pair of electrodes 116. In other words, the second dielectric layer 124 buries the electrodes 116.

In at least some embodiments of the present disclosure, the second dielectric layer 124 may be composed of a silicon oxide or a silicon nitride. In at least some embodiments of the present disclosure, the second dielectric layer 124 may be formed having a thickness of between ten nanometers and several hundred nanometers, inclusively. The second dielectric layer 124 acts as a barrier to subsequent electrodeposition of further materials on the first metal material of the electrodes 116.

The second dielectric layer 124 may be formed using multiple deposition methods. For example, in at least one embodiment of the present disclosure, the second dielectric layer 124 may be formed by first applying a thin seed layer (having a thickness of, for example, between two and ten nanometers, inclusively) using atomic layer deposition (ALD). In such embodiments, this is followed by a form of chemical vapor deposition (CVD), such as plasma-enhanced CVD (PECVD). In such embodiments, the ALD seed layer provides improved interface coupling with the electrodes, and thus facilitates a better electrodeposition barrier. This is advantageous because the function of the second dielectric layer 124 as an electrodeposition barrier avoids capillary coating of the buried electrodes 116. More specifically, improving the barrier provided by the second dielectric layer 124 decreases the amount of capillary coating of the buried electrodes 116.

Figure 1C:
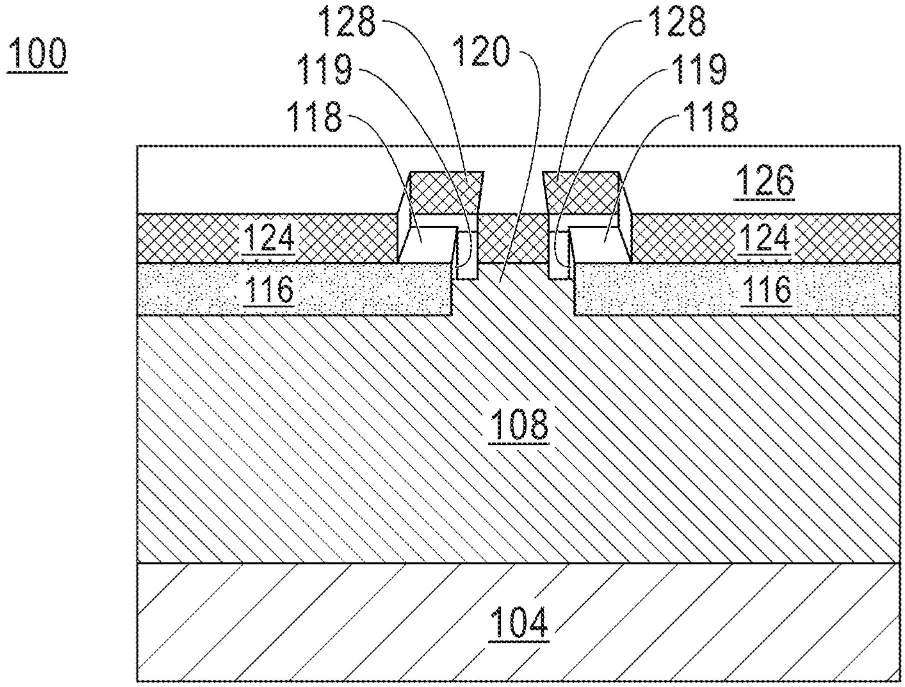
FIG. 1C illustrates a cross-sectional top perspective view of the device of FIG. 1B at a subsequent stage in a manufacturing process, in accordance with some embodiments of the present disclosure.

Referring now to FIG. 1C, wells 128 are formed in the second dielectric layer 124. More specifically, at least one well 128 is formed on each electrode 116. The wells 128 can be formed, for example, by a second lithography process in combination with reactive-ion etching (RIE). In other words, wells 128 are formed by applying at least one process to remove specific portions of the second dielectric layer 124. In particular, the specific portions of the second dielectric layer 124 that are removed are located above the electrodes 116 prior to removal. The process of forming the at least one well 128 enables precise dimensioning and shaping of the at least one well 128.

In some embodiments of the present disclosure, such as that depicted in FIG. 1C, the wells 128 are formed so as to be located at adjacent edges of the electrodes 116 of a pair of electrodes. In such embodiments, processes are applied to remove the second dielectric layer 124 from an area on top of each of a pair of adjacent electrodes 116 as well as from between those electrodes 116.

In at least some alternative embodiments, the wells 128 can be formed in locations having larger, or different, underlying areas of the electrodes 116, rather than the edges. In such embodiments, processes are applied to remove the second dielectric layer 124 from an area on top of each electrode 116. In at least some alternative embodiments, the wells 128 can be formed in both locations at the edges of adjacent electrodes 116 and in locations having larger, or different, underlying areas of the electrodes 116. The locations and number of wells 128 is determined based on the purpose of the electrodes 116 and the device 100.

Each of the wells 128 is formed in the second dielectric layer 124 so as to extend downwardly from an uppermost surface 126 of the second dielectric layer 124 to the electrode 116. More specifically, each well 128 extends to the uppermost surface 118 of the corresponding electrode 116. In some embodiments, such as that shown in FIG. 1C, each well 128 also extends into the first area 120 of the first dielectric layer 108. In such embodiments, the wells 128 open up surface area on top of each electrode 116 as well as in between the electrodes 116 of a pair of electrodes. Put another way, at least a portion of the uppermost surface 118 of each electrode 116 as well as at least a portion of an adjacent side surface 119 of each electrode 116 is exposed by removing the second dielectric layer 124 from those locations and, therefore, forming wells 128 at those locations.

Figure 1D:
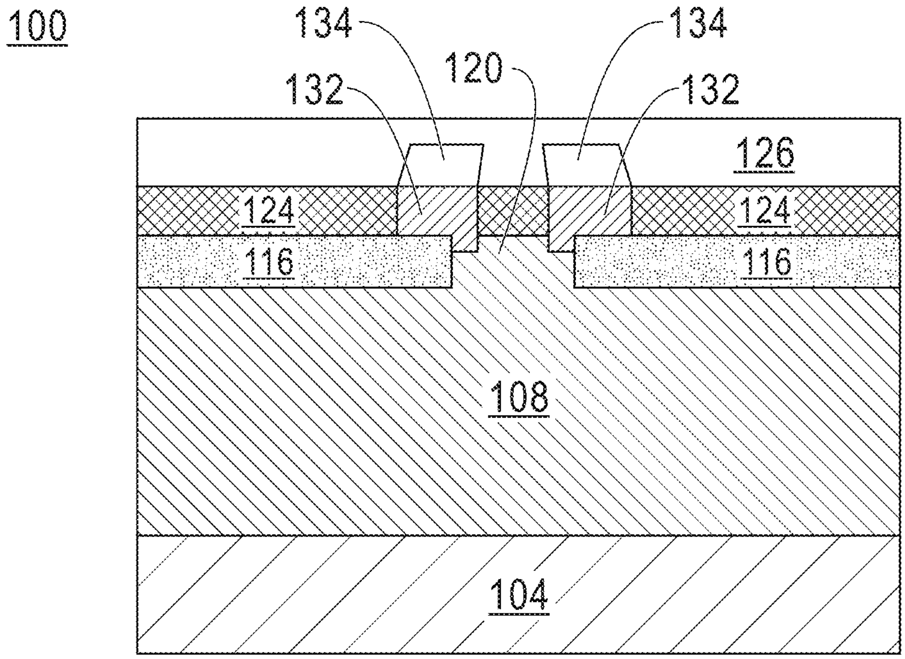
FIG. 1D illustrates a cross-sectional top perspective view of the device of FIG. 1C at a subsequent stage in a manufacturing process, in accordance with some embodiments of the present disclosure.

Turning now to FIG. 1D, the wells 128 (shown in FIG. 1C) are filled with a second metal material so as to form caps 132 on adjacent ends of each electrode 116 of a pair of electrodes. In particular, the second metal material is in direct contact with the first metal material of the electrodes 116 such that the caps 132 are in direct contact with the electrodes 116. In other words, there is no liner or additional material interposed between the electrodes 116 and the caps 132. Instead, the caps 132 are formed directly on the electrodes 116.

The caps 132 can be formed by, for example, applying an electroplating, electrodeposition, or electroless deposition process directly. In contrast with other methods, in this way, the second metal material is applied without a liner so as to coat the portions of the electrodes 116 that are exposed by the wells 128. By enabling precise dimensioning and shaping of the at least one well 128, filling the at least one well 128 with the second metal material can form a cap 132 having substantially similarly precise dimensioning and shaping.

In at least some embodiments of the present disclosure, the second metal material can be a noble metal such as, for example, without limitation, gold (Au), platinum (Pt), rhodium (Rh), palladium (Pd), or an alloy that is suitable for microfluidic environments. Accordingly, the wells 128 are filled with the second metal material so as to form a noble metal electrode cap 132 on each electrode 116. As shown in FIG. 1D, in at least some embodiments of the present disclosure, each cap 132 covers at least a portion of the uppermost surface 118 (shown in FIG. 1C) of a corresponding electrode 116 and at least a portion of the adjacent side surface 119 (shown in FIG. 1C) of the corresponding electrode 116.

In at least some embodiments of the present disclosure, electroplating or electroless deposition alone may be used to fill the wells 128. However, in some embodiments, an additional touch-up chemical mechanical polish (CMP) of the second metal material may be applied to compensate for a differential in the deposition rate from wafer edge to center and between co-located wells of different dimensions and scale. In such embodiments, this may be accomplished for small amounts of deposited material, such as Rh, using an appropriate slurry chemistry and buffer. In either case, the electrode caps 132 are processed so as to be substantially coplanar with the uppermost surface 126 of the second dielectric layer 124.

Figure 1E:
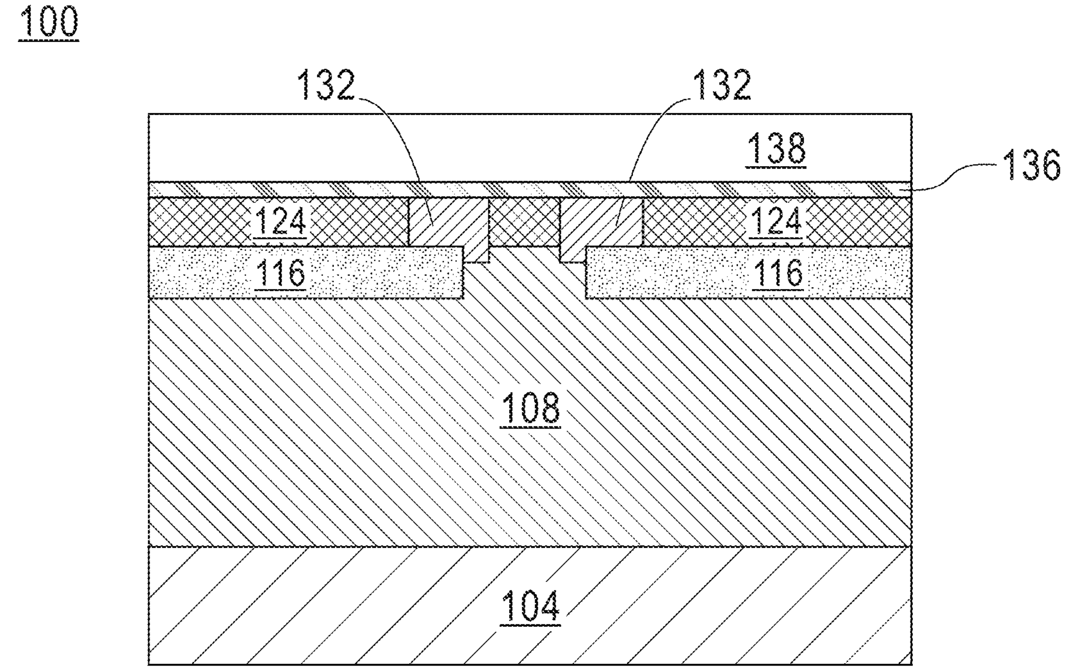
FIG. 1E illustrates a cross-sectional top perspective view of the device of FIG. 1D at a subsequent stage in a manufacturing process, in accordance with some embodiments of the present disclosure.

As shown in FIG. 1E, a third dielectric layer 136 is formed on the uppermost surface 126 (shown in FIG. 1D) of the second dielectric layer 124 and on an uppermost surface 134 of the electrode caps 132 (shown in FIG. 1D). In other words, the third dielectric layer 136 is formed so as to coat, or cover, the second metal material of the caps 132. In at least some embodiments of the present disclosure, the third dielectric layer 136 is formed of a blanket silicon oxide and silicon nitride. In at least some embodiments of the present disclosure, the third dielectric layer 136 is formed having a thickness of between five and 500 nanometers, inclusively. In some embodiments of the present disclosure, the thickness of the third dielectric layer 136 is approximately ten nanometers.

Figure 1F:
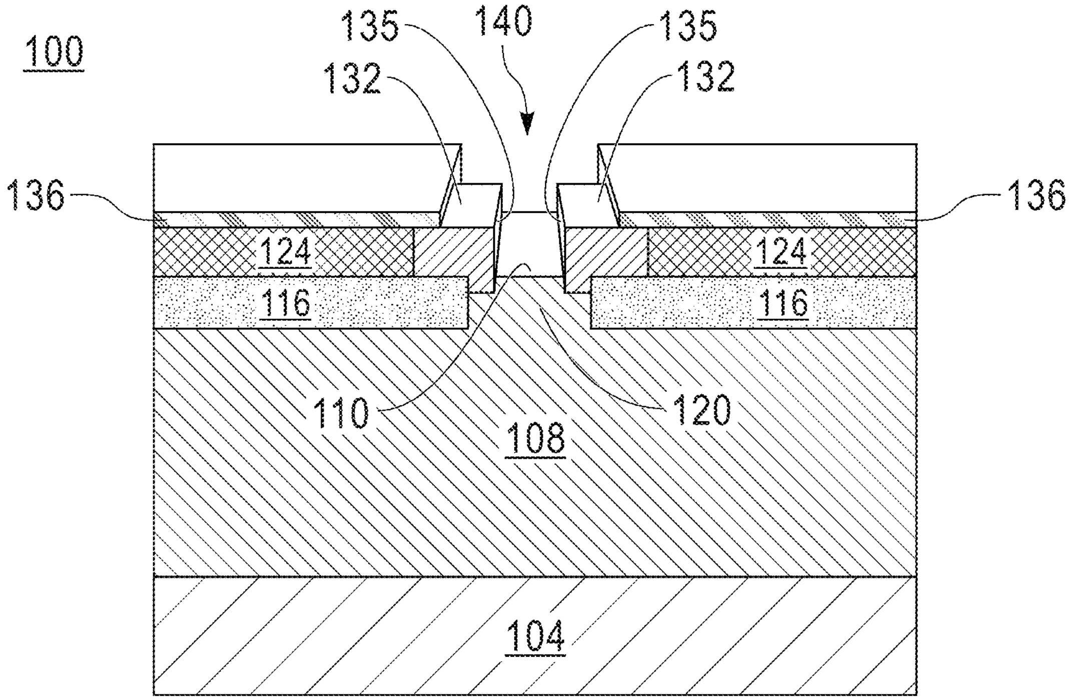
FIG. 1F illustrates a cross-sectional top perspective view of the device of FIG. 1E at a subsequent stage in a manufacturing process, in accordance with some embodiments of the present disclosure.

Turning now to FIG. 1F, a channel 140 is formed in the third dielectric layer 136 and the second dielectric layer 124 between the caps 132 on each pair of electrodes 116. The channel 140 can be formed, for example, by at least one process applied to remove specific portions of dielectric layers. In at least some embodiments, the at least one process is an RIE-based channel etch. In the present embodiment, for example, the at least one process includes a third lithography process in combination with RIE. The process of forming the channel 140 enables precise dimensioning and shaping of the channel 140.

The channel 140 is formed so as to extend to the uppermost surface 110 of the first dielectric layer 108 and to adjacent inward side surfaces 135 of adjacent caps 132. In other words, the channel 140 is formed by applying at least one process to remove specific portions of the third dielectric layer 136 and the portion of the second dielectric layer 124 which remained between the two wells 128 (shown in FIG. 1C) such that a portion of the first dielectric layer 108 between the caps 132 is exposed. Additionally, the adjacent inward side surfaces 135 of the caps 132 are also exposed by applying the at least one process.

Notably, the channel 140 does not extend to the electrodes 116. Instead, the caps 132 and the area 120 of the first electrode layer 108 prevent the electrodes 116 from being exposed by the formation of the channel 140. In other words, the electrodes 116 remain buried by the first electrode layer 108, the caps 132, and the second electrode layer 124. As explained in further detail below, preventing exposure of the electrodes 116 prevents easily degraded material of the electrodes 116 from being exposed to fluidic samples in subsequent use of the device. Accordingly, surfaces of the electrodes 116 are protected from rapid oxidation, corrosion, and/or fouling by the fluidic samples, which reduces negative impact on the function of the device 100.

Figure 1G:
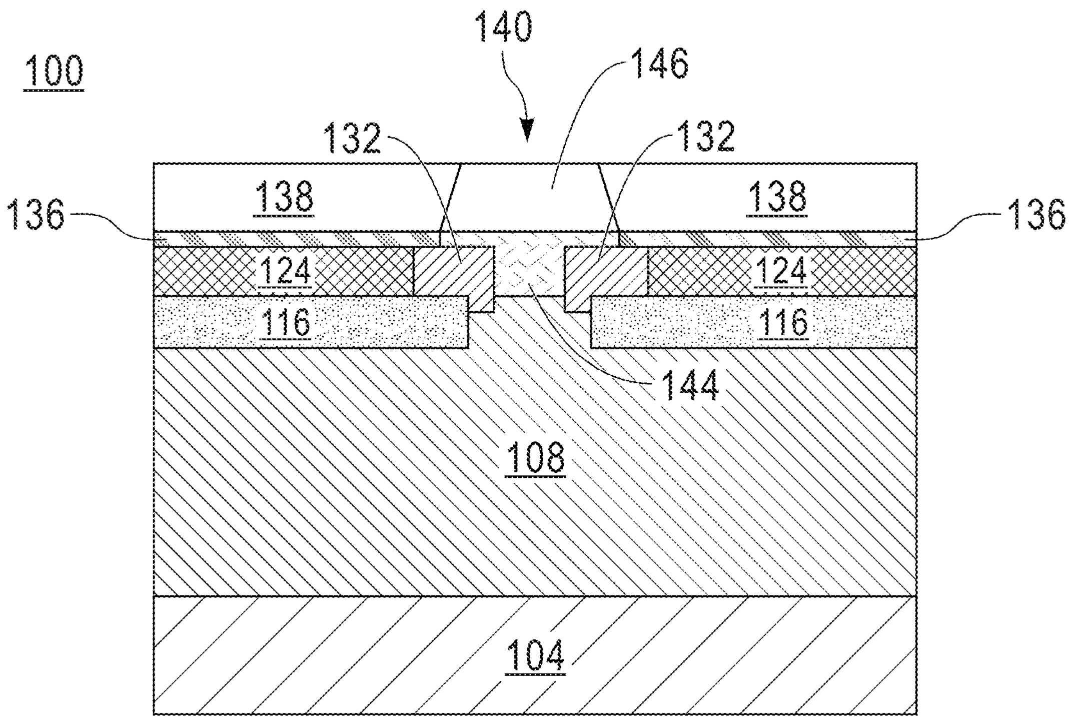
FIG. 1G illustrates a cross-sectional top perspective view of the device of FIG. IF at a subsequent stage in a manufacturing process, in accordance with some embodiments of the present disclosure.

Turning now to FIG. 1G, the channel 140 is filled with a structural material 144. As shown, because the channel 140 did not extend to the electrodes 116, the structural material 144 does not directly contact the electrodes 116. In at least one embodiment of the present disclosure, the structural material 144 can be, for example, an organic planarization layer (OPL). The OPL acts as a structural surrogate, which is subsequently removed. In at least one embodiment of the present disclosure, the channel 140 is filled and overcoated with spin-on OPL. The OPL is then polished using CMP to form a sacrificial, structural surrogate for the subsequent deposition of a material that forms a ceiling (discussed in further detail below) for the channel 140.

In embodiments of the present disclosure wherein the channel 140 has a width greater than a few micrometers, appropriate fill features are included, which support the integrity of the ceiling for the channel 140. Such fill features may include, for example, pillars. The fill features are not shown in FIG. 1G, but may be formed in the following manner. The fill features are made of the first dielectric layer 108, the second dielectric layer 124, and the third dielectric layer 136. More specifically, the fill features are formed at the time when the channel 140 is formed and, thus, are formed with the same depth as the channel 140. Accordingly, the fill features are formed by removing portions of the third dielectric layer 136, the second dielectric layer 124, and the first dielectric layer 108 such that columns or pillars of the three layers of material remain. Thus, each pillar is stratified having the first dielectric layer 108 at the base, the second dielectric layer 124 in the middle, and the third dielectric layer 136 at the top. An example including such fill features is described below with reference to FIG. 3C.

Figure 1H:
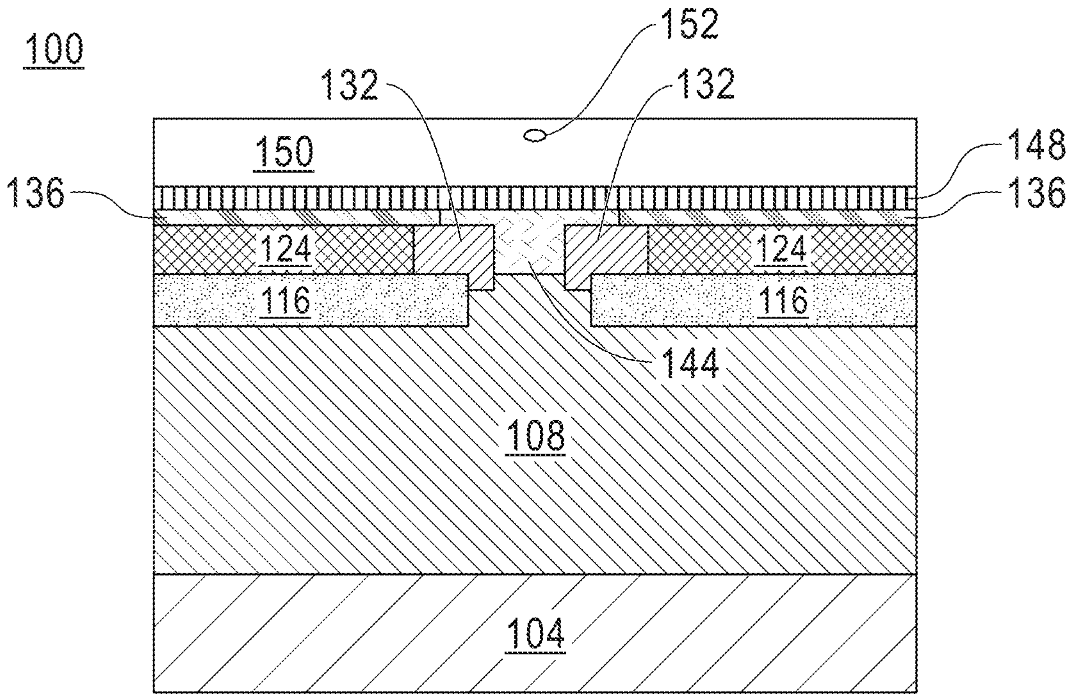
FIG. 1H illustrates a cross-sectional top perspective view of the device of FIG. 1G at a subsequent stage in a manufacturing process, in accordance with some embodiments of the present disclosure.

As shown in FIG. 1H, a fourth dielectric layer 148 is formed on an uppermost surface 138 (shown in FIG. 1G) of the third dielectric layer 136 and on an uppermost surface 146 (shown in FIG. 1G) of the structural material 144. In at least some embodiments of the present disclosure, the fourth dielectric layer 148 can be formed using CVD. In at least some embodiments of the present disclosure, the fourth dielectric layer can have a thickness of, for example, between 100 and 300 nanometers, inclusively.

The fourth dielectric layer 148 is patterned with a fourth lithography process and is etched to create a periodic array of vent holes 152, which are etched over and down to the buried structural material 144. Only one vent hole 152 is shown in FIG. 1H. However, the present disclosure enables a plurality of vent holes 152 formed in the fourth dielectric layer 148. Each vent hole 152 is sufficiently small in diameter to permit its closure by deposition of a subsequent fifth dielectric layer (discussed in further detail below). In at least some embodiments of the present disclosure, the diameter of each vent hole 152 is, for example, between 100 and 300 nanometers, inclusively.

Figure 1I:
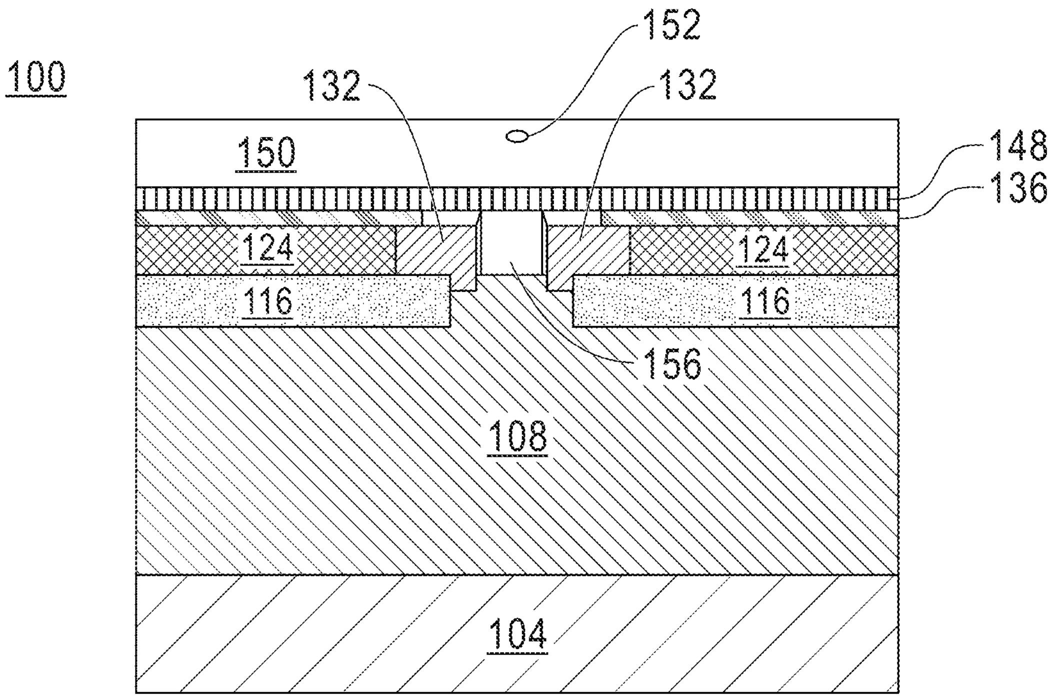
FIG. 1I illustrates a cross-sectional top perspective view of the device of FIG. 1H at a subsequent stage in a manufacturing process, in accordance with some embodiments of the present disclosure.

Turning now to FIG. 1I, the structural material 144 (shown in FIG. 1H) is selectively extracted via the vent holes 152, producing an empty cavity 156 which had previously been occupied by the structural material 144. In some embodiments of the present disclosure, a carbon-pull process is used to selectively extract the structural material 144. In some embodiments of the present disclosure, the carbon-pull process can be, for example, a directional RIE-based $O_2$ strip. A fluidic seal on the cavity 156 is begun by the formation of the fourth dielectric layer 148 over the cavity 156 and the extraction of the structural material 144 from the cavity 156.

Figure 1J:
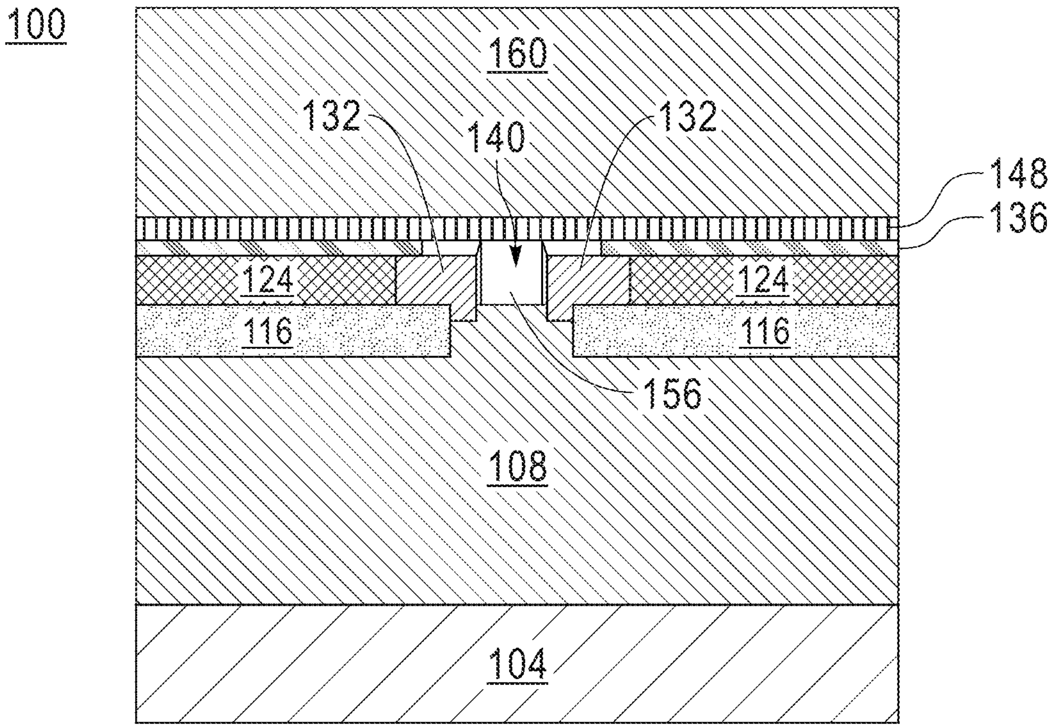
FIG. 1J illustrates a cross-sectional top perspective view of the device of FIG. 1I at a subsequent stage in a manufacturing process, in accordance with some embodiments of the present disclosure.

Turning now to FIG. 1J, a fifth dielectric layer 160 is formed on an uppermost surface 150 (shown in FIG. 1H) of the fourth dielectric layer 148 so as to close, or seal, the vent holes 152 (shown in FIG. 1H), providing a fluidic seal for the microfluidic device 100. In the present embodiment, the fifth dielectric layer 160 is relatively thick. For example, the thickness of the fifth dielectric layer 160 is large relative to the thickness of the second, third, and fourth dielectric layers 124, 136, 148. The fifth dielectric layer 160 provides structural rigidity to form a robust and reliable seal of the channel 140 and cavity 156 between each pair of electrodes 116. Following the formation of the fifth dielectric layer 160, fluidic and/or electrical access points are opened to ready the device 100 for use. In at least some embodiments of the present disclosure, fluidic access ports are etched in the two-stage dielectric to permit the introduction of fluids into the device 100.

Notably, as shown in FIG. 1J, the device 100 includes the first metal material of the electrodes 116 in direct contact with the second metal material of the caps 132, which may be composed of a number of noble metals or metal alloys suitable for interfacing with different fluidic mediums.

Additionally, the caps 132 of the device 100 interface with a cavity 156, which acts as a reservoir, such as a nanochannel or larger structure, that may subsequently be filled with a fluid, including a liquid or a gas. However, the electrodes 116 do not directly interface with the cavity 156.

It is also notable that the caps 132 are well-structured and defined, which is made possible through a templated well-etch process, such as that discussed above with respect to FIG. 1C.

Additionally, the cavity 156 is fluidically sealed. More specifically, the cavity 156 is first sealed with a thin dielectric layer, such as the fourth dielectric layer 148, including vent holes 152 through which the structural material 144 is extracted using a carbon-pull process (such as is discussed above with respect to FIG. 1I). The cavity 156 is then further fluidically sealed by a thick dielectric layer, such as the fifth dielectric layer 160, fluidically sealing the cavity 156 so as to enable confining a liquid within the device 100.

In some embodiments of the present disclosure, such as the embodiments described above with reference to FIGS. 1A-1J, producing the final structure of the device 100 includes implementing four lithography layers to pattern various features, including the electrodes 116, the caps 132, the channel 140, and the vent holes 152. Depending on the complexity of the device 100 that is required for the particular use of the device, additional lithography layers may be added as needed. For example, in some embodiments of the present disclosure, another lithography layer could be used to generate interconnect layers for multi-channel devices. As another example, in some embodiments of the present disclosure, another lithography layer could be used to generate three-dimensional fluidic networks for sample and reagent distribution.

In other words, in some embodiments of the present disclosure, it is possible to form a device having more complex shapes than those shown in and described with reference to FIGS. 1A-1J by applying substantially the same processes. In such embodiments, regions of the device having three-dimensional electrodes or multi-layer cavities constructed on two-dimensional electrodes, or combinations thereof, may be used as scaffolds or as a foundation for forming a broader range of cap geometries. Where a particular application calls for, or can benefit from, this type of complexity, it can be achieved by the present disclosure. For example, L-shaped, omega-shaped, closed-loop, finger-shaped, and comb-shaped electrode cap structures can be formed according to the present disclosure, each with lithography precision.

Figure 2:
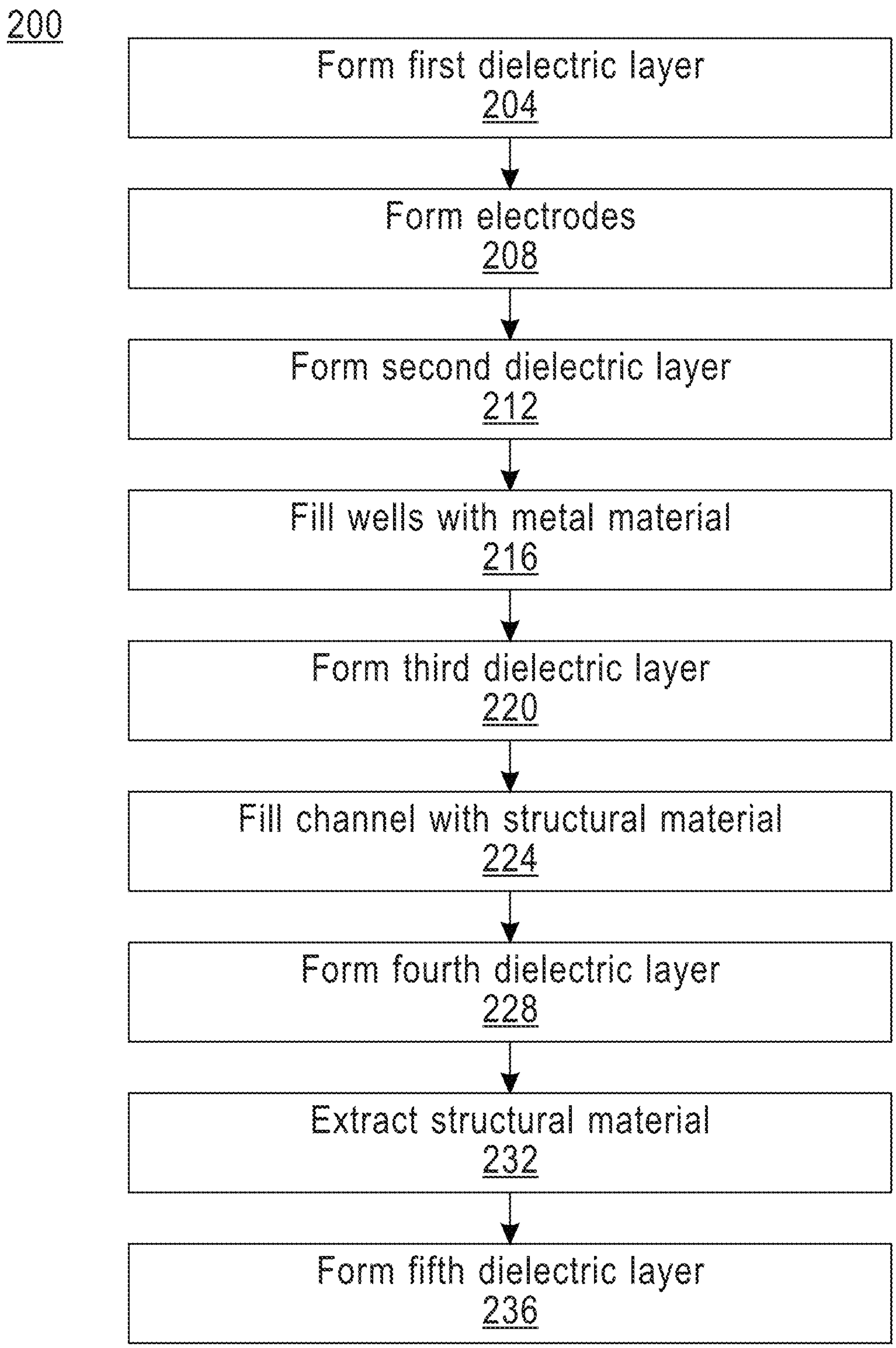
FIG. 2 depicts a flowchart of a method for forming a device, such as the device shown in FIG. 1J, in accordance with some embodiments of the present disclosure.

FIG. 2 depicts a flowchart of a method 200 for forming the device 100 shown in FIG. 1J, in accordance with some embodiments of the present disclosure. As discussed above with respect to FIGS. 1A-1J, in at least some embodiments of the present disclosure, forming the device 100 includes forming the device 100 such that direct contact between the structural material 144 and the electrodes 116 is prevented by the metal material of the caps 132 and the first dielectric material of the first dielectric layer 108.

Beginning at operation 204, the first dielectric layer 108 is formed. More specifically, in at least some embodiments of the present disclosure, the first dielectric layer 108 is formed on the substrate 104, as discussed above with respect to FIG. 1A.

At operation 208, the electrodes 116 are formed. More specifically, in at least some embodiments of the present disclosure, the electrodes 116 are formed partially into the first dielectric layer 108, as discussed above with respect to FIG. 1A. As discussed above with respect to FIG. 1A, in at least some embodiments of the present disclosure, forming the electrodes 116 includes forming the electrodes 116 such that the uppermost surface 118 of each electrode 116 is at least substantially coplanar with the uppermost surface 110 of the first dielectric layer 108.

At operation 212, the second dielectric layer 124 is formed. More specifically, in at least some embodiments of the present disclosure, the second dielectric layer 124 is formed on the electrodes 116, as discussed above with respect to FIG. 1B. As discussed above with respect to FIG. 1B, in at least some embodiments of the present disclosure, forming the second dielectric layer 124 includes forming the second dielectric layer 124 such that the second dielectric layer 124 extends over an entirety of the uppermost surface 118 of each electrode 116. Additionally, in at least some embodiments of the present disclosure, forming the second dielectric layer 124 includes forming the second dielectric layer 124 such that the second dielectric layer 124 has a lowermost surface 127 (shown in FIG. 1B) that is in direct contact with the electrodes 116. Additionally, in at least some embodiments of the present disclosure, forming the second dielectric layer 124 includes forming the second dielectric layer 124 in direct contact with the first dielectric layer 108 between the electrodes 116.

At operation 216, the wells 128 formed in the second dielectric layer 124 are filled with metal material. More specifically, in at least some embodiments of the present disclosure, the wells 128 are formed in the second dielectric layer 124, as discussed above with respect to FIG. 1C, and are filled with the second metal material to form caps 132 in direct contact with the electrodes 116, as discussed above with respect to FIG. 1D. As discussed above with respect to FIG. 1C, in at least some embodiments of the present disclosure, each well 128 extends through the uppermost surface 126 of the second dielectric layer 124 and extends through the lowermost surface 127 of the second dielectric layer 124.

At operation 220, the third dielectric layer 136 is formed. More specifically, in at least some embodiments of the present disclosure, the third dielectric layer 136 is formed on the second metal material of the caps 132 and on the second dielectric layer 124, as discussed above with respect to FIG. 1E. As discussed above with respect to FIG. 1E, in at least some embodiments of the present disclosure, forming the third dielectric layer 136 includes forming the third dielectric layer 136 in direct contact with the second dielectric layer 124 between the two wells 128. Additionally, in at least some embodiments of the present disclosure, forming the third dielectric layer 136 includes forming the third dielectric layer 136 such that the third dielectric layer 136 does not directly contact the electrodes 116.

At operation 224, the channel 140 formed in the third dielectric layer 136 is filled with structural material 144. More specifically, in at least some embodiments of the present disclosure, the channel 140 is formed in the third dielectric layer 136 between the two wells 128, as discussed above with respect to FIG. 1F, and is filled with the structural material 144 such that the structural material 144 does not directly contact the electrodes 116, as discussed above with respect to FIG. 1G.

At operation 228, the fourth dielectric layer 148 is formed. More specifically, in at least some embodiments of the present disclosure, the fourth dielectric layer 148 is formed on the third dielectric layer 136 and on the structural material 144, as discussed above with respect to FIG. 1H.

At operation 232, the structural material 144 is extracted. More specifically, in at least some embodiments of the present disclosure, the structural material 144 is extracted through at least one vent hole 152 formed in the fourth dielectric layer 148, as discussed above with respect to FIG. 1I.

At operation 236, the fifth dielectric layer 160 is formed. More specifically, in at least some embodiments of the present disclosure, the fifth dielectric layer 160 is formed on the fourth dielectric layer 148, as discussed above with respect to FIG. 1J. As discussed above with respect to FIG. 1J, in at least some embodiments of the present disclosure, forming the fifth dielectric layer 160 includes forming the fifth dielectric layer 160 such that the fifth dielectric layer 160 fluidically seals the at least one vent hole 152.

The method 200 and device 100 described above are illustrative examples according to some embodiments of the present disclosure. One advantage of the method 200 and device 100, however, is that it is adaptable, or tailorable, for various applications or uses. For example, in applications such as for drive electrodes used to move fluids electrokinetically within a microfluidic device or sense electrodes in a device based on the principle of resistive-pulse sensing (RPS), well-structured and precisely defined electrode caps (like caps 132) are not required. Accordingly, in such embodiments, the formation of wells (like wells 128) may be unnecessary. In such embodiments, a method for forming such a device could skip operations performing the actions of operations 212 and 220. In other words, in such embodiments, a method for forming such a device could proceed from performing the actions of operation 208 directly to performing the actions of operation 216 followed by the actions of operation 224. Such a method is referred to herein as a reduced-step method. One result of such a reduced-step method is shown in FIGS. 3A-3F.

Figures 3A, 3B, 3C, 3D, 3E, 3F:
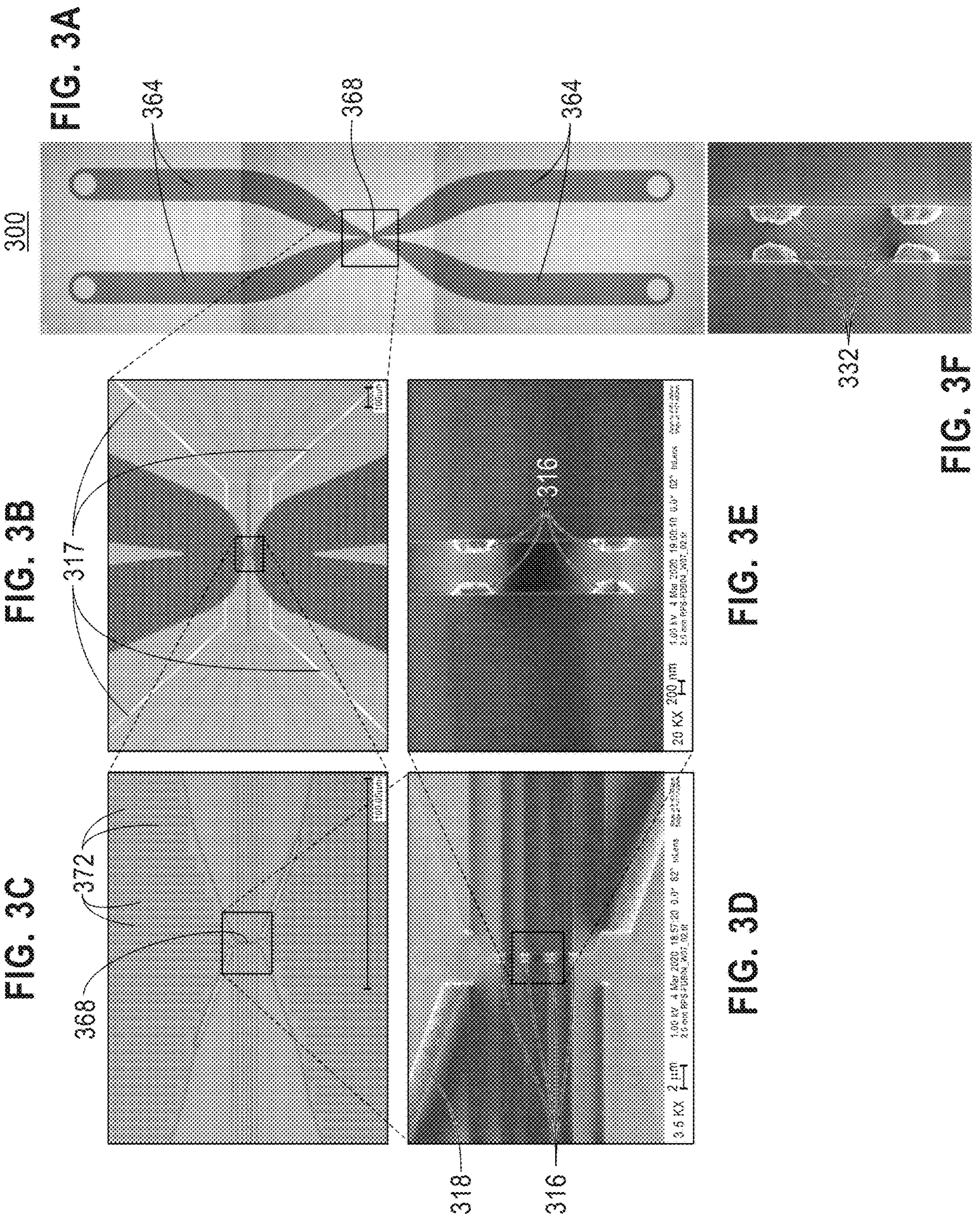
FIG. 3A depicts a device formed using a method, such as the method depicted in FIG. 2, in accordance with some embodiments of the present disclosure.
FIG. 3B depicts a partial view of the device of FIG. 3A that has been magnified, in accordance with some embodiments of the present disclosure.
FIG. 3C depicts a partial view of the device of FIG. 3B that has been magnified, in accordance with some embodiments of the present disclosure.
FIG. 3D depicts a partial view of the device of FIG. 3C that has been magnified, in accordance with some embodiments of the present disclosure.
FIG. 3E depicts a partial view of the device of FIG. 3D that has been magnified, in accordance with some embodiments of the present disclosure.
FIG. 3F depicts a partial view of the device of FIG. 3E following a subsequent operation.

As shown in FIGS. 3A-3C, the illustrative device 300 includes microfluidic reservoirs 364 connected by a channel 368 at the center of the device 300 where several electrodes 316 (shown in FIG. 3D), 317 (shown in FIG. 3B), and 318 (shown in FIG. 3D) with different functions are located. FIG. 3B is a partial view of FIG. 3A that has been magnified. FIG. 3B illustrates force electrodes 317, which are located outside the channel regions. The force electrodes 317 are responsible for moving ionic particles in the reservoirs 364 through the channel 368. FIG. 3C is a partial view of FIG. 3B that has been magnified. Considered together, FIGS. 3A-3C illustrate the channel 368 in the context of the larger device 300.

FIG. 3D is a partial view of FIG. 3C that has been magnified. FIG. 3D illustrates pairs of transverse electrodes 316, which are located within the channel 368. The transverse electrodes 316 are substantially similar to the electrodes 116 discussed above. FIG. 3D also illustrates sense electrodes 318, which are located outside the channel regions. The sense electrodes are responsible for measuring changes in fluidic conductance through the channel 368 as particles pass through.

FIG. 3E depicts faceted Cu electrodes 316 before electrodeposition of Rh caps 332. In contrast, FIG. 3F depicts the faceted Cu electrodes 316 after electrodeposition of Rh caps 332. As illustrated by comparing FIG. 3E and FIG. 3F, the transverse electrode pairs are, in fact, capped; however, the precision of the gap dimensions between them and the morphology of the caps 332 shows variation and can be difficult to control in practice. Additionally, there is variation in gap size from wafer edge to center (not shown) that could lead to variation in sensing performance.

Accordingly, while a reduced-step method may not be ideal for transverse electrode pairs 316, due to the required precision for electrodes in such pairs, the sense electrodes 318 outside the channel region are agnostic to the above mentioned variations. Therefore, such a reduced-step method may be applied to these types of electrodes and others like them.

Returning to FIG. 3C, fill features 372 are shown in the reservoirs 364 on either side of the channel 368. In the present embodiment, the fill features 372 are formed as round pillars. However, in alternative embodiments, the fill features 372 may be formed having a different structure or geometry. Regardless of the shape or geometry, the fill features 372 are formed so as to provide structural support for the thin fourth dielectric layer (such as 148, shown in FIGS. 1H-1J) during the carbon-pull process described above and shown in FIGS. 1H and 1I. One illustrative example of such a carbon-pull process is described in further detail below with reference to FIGS. 4A-4H.

Figures 4A, 4B, 4C, 4D, 4E, 4F, 4G, 4H:
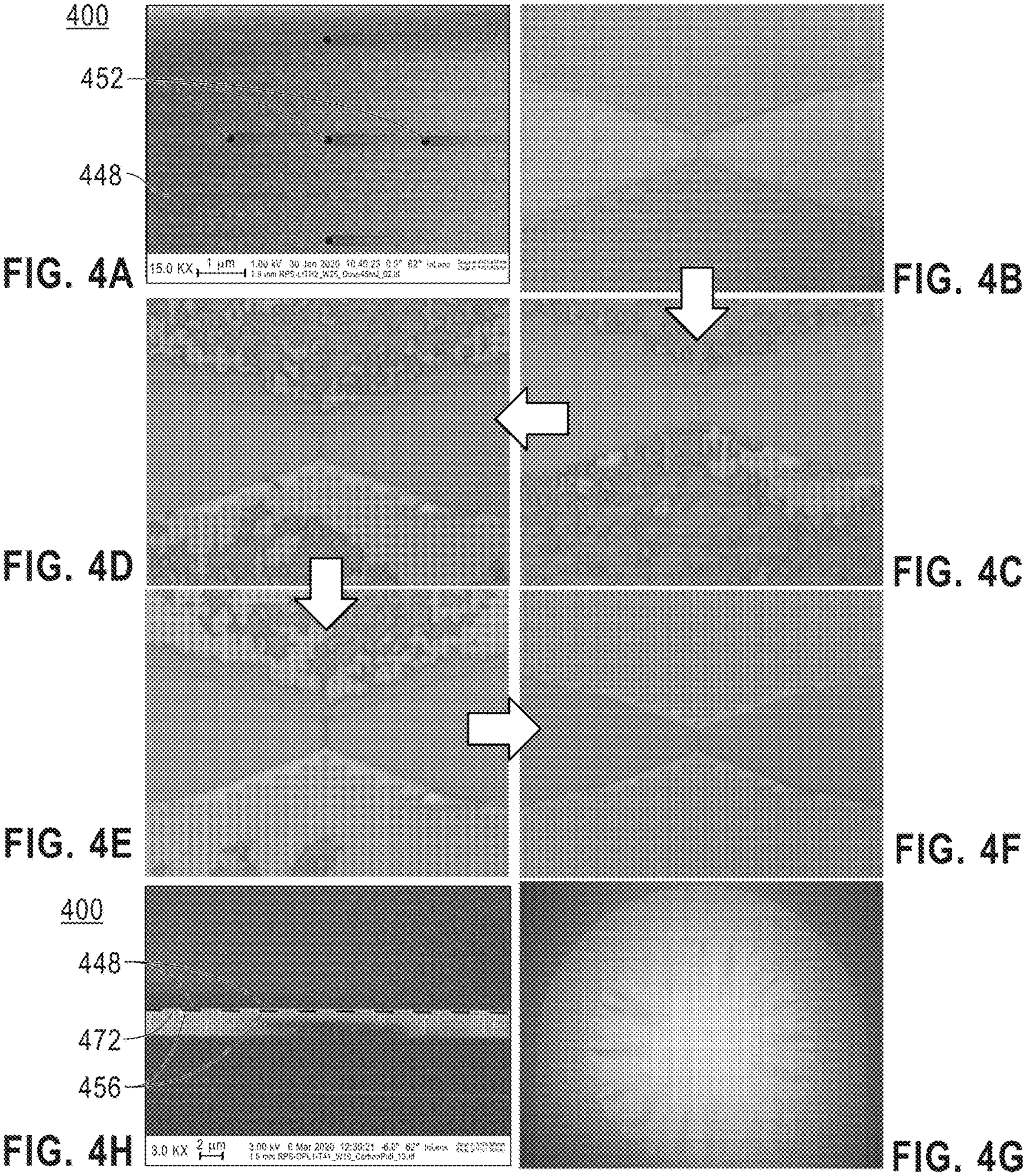
FIG. 4A depicts a top view of a device, such as that shown in FIG. 1H, including a plurality of vent holes, in accordance with some embodiments of the present disclosure.
FIG. 4B depicts a partial cross-sectional view of the device of FIG. 4A at one stage in an extraction process, in accordance with some embodiments of the present disclosure.
FIG. 4C depicts a partial cross-sectional view of the device of FIG. 4B at another stage in an extraction process, in accordance with some embodiments of the present disclosure.
FIG. 4D depicts a partial cross-sectional view of the device of FIG. 4C at another stage in an extraction process, in accordance with some embodiments of the present disclosure.
FIG. 4E depicts a partial cross-sectional view of the device of FIG. 4D at another stage in an extraction process, in accordance with some embodiments of the present disclosure.
FIG. 4F depicts a partial cross-sectional view of the device of FIG. 4E at another stage in an extraction process, in accordance with some embodiments of the present disclosure.
FIG. 4G depicts a top view of the device of FIG. 4F, in accordance with some embodiments of the present disclosure.
FIG. 4H depicts a cross-sectional view of the device of FIG. 4A, following the extraction process shown in FIGS. 4B-4F, in accordance with some embodiments of the present disclosure.

In particular, as shown in FIG. 4A, the device 400 includes a periodically arranged array of vent holes 452, which are substantially similar to vent holes 152 described above with reference to FIGS. 1H and 1I. In the embodiment shown in FIG. 4A, the vent holes 452 have a diameter of approximately 200 nanometers. In alternative embodiments, vent holes 452 may have a different diameter that is sufficiently small in diameter to permit its closure by deposition of a subsequent fifth dielectric layer. In the embodiment shown in FIG. 4A, the fourth dielectric layer 448 is made of silicon oxide. In alternative embodiments, the fourth dielectric layer 448 may be made of a different dielectric material. In the embodiment shown in FIG. 4A, the fourth dielectric layer 448 has a thickness of approximately 300 nanometers. In alternative embodiments, the fourth dielectric layer 448 may have a different thickness that is sufficiently thick to provide structural support for the vent holes 152 and is sufficiently thin to prevent filling the cavity once the structural material is removed.

The vent holes 452 are positioned above and between fill features 472 (not visible in FIG. 4A), which are substantially similar to the fill features 372 described above with reference to FIG. 3C. In the embodiment shown in FIGS. 4A-4H, the vent holes 452 are aligned to the fill features 472 that lay beneath the fourth dielectric layer 448 such that the vent holes 452 are positioned above and between the fill features 472.

The fill features 472 are used in conjunction with a carbon-pull process (such as a directional, RIE-based $O_2$ strip) to remove the structural material (such as OPL), forming a cavity 456 (shown in FIG. 4H) beneath the fourth dielectric layer. In the context of FIGS. 1A-1J, the use of substantially similar fill features in conjunction with a substantially similar extraction process enables the structural material 144 to be removed, forming the cavity 156 beneath the fourth dielectric layer 148.

FIGS. 4B-4F illustrate a time sequence of the extraction process. Arrows indicate the progression of the time sequence. In FIGS. 4B-4F, the fourth dielectric layer is optically transparent, enabling visual observation of the extraction of the structural material. FIG. 4B illustrates the device 400 prior to performance of the extraction process. FIG. 4C illustrates the device 400 after the extraction process has been performed for two minutes. FIG. 4D illustrates the device 400 after the extraction process has been performed for four minutes. FIG. 4E illustrates the device 400 after the extraction process has been performed for six minutes. FIG. 4F illustrates the device 400 after the extraction process has been performed for twelve minutes.

As shown in FIG. 4G, an unsupported membrane forms over a fluidic access port where fill features are absent.

FIG. 4H is a cross-sectional scanning electron microscope image of the cavities 456 after completion of the extraction process. As shown in FIG. 4H, the thin fourth dielectric layer 448 is supported over the cavities 456 by pillar fill features 472. The cavities 456 are substantially similar to the cavity 156 described above with reference to FIGS. 1I and 1J. The fourth dielectric layer 448 is substantially similar to the fourth dielectric layer 148 described above with reference to FIGS. 1H-1J.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for forming a microfluidic device, the method comprising:

forming a first dielectric layer on a substrate;

embedding electrodes into a top surface of the first dielectric layer;

forming a second dielectric layer on the electrodes, the second dielectric layer having two wells and a channel between the two wells formed therein;

filling, with a metal material, the two wells such that the metal material is in direct contact with the electrodes;

forming a third dielectric layer on the metal material and on the second dielectric layer;

filling, with a structural material, the channel such that the structural material does not directly contact the electrodes;

forming a fourth dielectric layer on the third dielectric layer and on the structural material, the fourth dielectric layer having at least one vent hole formed therein;

extracting the structural material through the at least one vent hole formed in the fourth dielectric layer; and forming a fifth dielectric layer on the fourth dielectric layer.

2. The method of claim 1, wherein:

forming the second dielectric layer includes forming the second dielectric layer such that the second dielectric layer has a lowermost surface in direct contact with the electrodes and has an uppermost surface directly opposite the lowermost surface, and each of the two wells extends through the uppermost surface of the second dielectric layer and extends through the lowermost surface of the second dielectric layer.

3. The method of claim 1, wherein forming the second dielectric layer includes forming the second dielectric layer in direct contact with the first dielectric layer in an area between the electrodes.

4. The method of claim 1, wherein forming the third dielectric layer includes forming the third dielectric layer in direct contact with the second dielectric layer in an area between the two wells.

5. The method of claim 1, wherein the third dielectric layer does not directly contact the electrodes.

6. The method of claim 1, wherein forming the fifth dielectric layer includes forming the fifth dielectric layer such that the fifth dielectric layer seals each of the at least one vent hole.

7. The method of claim 1, wherein the metal material and the first dielectric layer prevent direct contact between the structural material and the electrodes.

8. The method of claim 1, wherein embedding the electrodes includes forming the electrodes such that an uppermost surface of each electrode is at least substantially coplanar with an uppermost surface of the first dielectric layer.

9. The method of claim 8, wherein forming the second dielectric layer includes forming the second dielectric layer such that the second dielectric layer extends over an entirety of the uppermost surface of each electrode.

* * * * *